(12) United States Patent
Olsen et al.

(10) Patent No.: US 12,504,142 B2
(45) Date of Patent: *Dec. 23, 2025

(54) FLEXIBLE DIRECTIONAL VEHICLE WARNING LIGHT

(71) Applicant: Electronic Controls Company, Boise, ID (US)

(72) Inventors: Brian Lynn Olsen, Meridian, ID (US); Chen Chih Chiao, Tainan (TW)

(73) Assignee: Electronic Controls Company, Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/957,734

(22) Filed: Nov. 23, 2024

(65) Prior Publication Data

US 2025/0198589 A1 Jun. 19, 2025

Related U.S. Application Data

(63) Continuation of application No. 18/501,025, filed on Nov. 2, 2023, now Pat. No. 12,181,123, which is a
(Continued)

(51) Int. Cl.
*F21S 43/15* (2018.01)
*B60Q 1/26* (2006.01)
(Continued)

(52) U.S. Cl.
CPC .......... *F21S 43/15* (2018.01); *B60Q 1/2615* (2013.01); *B60Q 1/2696* (2013.01); *B60Q 1/52* (2013.01);
(Continued)

(58) Field of Classification Search
CPC .. F21S 43/14; F21S 43/15; F21S 43/26; F21S 45/47; B60Q 1/2615; B60Q 1/2696; B60Q 1/52
See application file for complete search history.

(56) References Cited

U.S. PATENT DOCUMENTS

| 5,436,809 A | 7/1995 | Brassier et al. |
| D415,296 S | 10/1999 | Gavin |

(Continued)

FOREIGN PATENT DOCUMENTS

| CN | 304289119 S | 9/2017 |
| CN | 110578878 A | 12/2019 |

(Continued)

OTHER PUBLICATIONS

Amazon, "Auto Pearl—High Power DC 12V 10 LED Flexible Auxiliary DRL Light—Maruti Suzuki Swift Dzire 2017," https://www.amazon.in/Maruti-Suzuki-Swift-Dzire-2017/dp/B073M8DGP8, accessed Dec. 2, 2019, 3 pages.

(Continued)

*Primary Examiner* — Christopher E Dunay
(74) *Attorney, Agent, or Firm* — Foster Garvey PC

(57) ABSTRACT

Disclosed is a directional warning light designed to bend along its longitudinal axis up to about 30° per side so as to conform to curved vehicle surfaces. Flexible components of the disclosed embodiments allow the bending and include a bendable optic, bendable base, and bendable circuit substrate.

16 Claims, 9 Drawing Sheets

Related U.S. Application Data continuation of application No. 17/758,537, filed as application No. PCT/US2021/012815 on Jan. 8, 2021, now Pat. No. 11,841,123.

(60) Provisional application No. 62/959,149, filed on Jan. 9, 2020.

(51) Int. Cl.
 *B60Q 1/52* (2006.01)
 *F21S 43/14* (2018.01)
 *F21S 43/20* (2018.01)
 *F21S 45/47* (2018.01)

(52) U.S. Cl.
 CPC ............... *F21S 43/14* (2018.01); *F21S 43/26* (2018.01); *F21S 43/265* (2024.05); *F21S 45/47* (2018.01)

(56) References Cited

U.S. PATENT DOCUMENTS

| | | | |
|---|---|---|---|
| D526,430 S | 8/2006 | Hernandez et al. | |
| D576,754 S | 9/2008 | Wang | |
| D653,783 S | 2/2012 | Biro et al. | |
| D714,480 S | 9/2014 | Law et al. | |
| D759,272 S | 6/2016 | Fan | |
| 9,651,206 B2 | 5/2017 | Vasta et al. | |
| D788,955 S | 6/2017 | Yu | |
| 10,060,605 B2 | 8/2018 | Lan et al. | |
| 11,180,076 B2 | 11/2021 | Baker et al. | |
| D939,118 S | 12/2021 | Ko | |
| D939,119 S | 12/2021 | Ko | |
| D970,764 S | 11/2022 | Ye | |
| D974,605 S | 1/2023 | Barry et al. | |
| 2002/0105432 A1 | 8/2002 | Pederson et al. | |
| 2003/0147253 A1 | 8/2003 | Shy | |
| 2004/0223327 A1 | 11/2004 | Kuan et al. | |
| 2009/0175047 A1 | 7/2009 | Tsai | |
| 2012/0153317 A1 | 6/2012 | Emerson et al. | |
| 2013/0135855 A1 | 5/2013 | Wildner | |
| 2014/0247595 A1 | 9/2014 | Lind et al. | |
| 2014/0268723 A1* | 9/2014 | Stein | F21S 43/315 362/218 |
| 2017/0059134 A1 | 3/2017 | Back et al. | |
| 2017/0122533 A1 | 5/2017 | Wang et al. | |
| 2017/0241611 A1* | 8/2017 | Pan | F21S 43/195 |
| 2018/0202622 A1* | 7/2018 | Arce | F21S 43/14 |
| 2019/0027646 A1 | 1/2019 | Lerman et al. | |
| 2019/0041010 A1 | 2/2019 | Joye et al. | |
| 2019/0157527 A1 | 5/2019 | Park et al. | |
| 2019/0368680 A1* | 12/2019 | Belitz | B60Q 3/208 |
| 2020/0011488 A1* | 1/2020 | Baker | F21S 43/195 |
| 2020/0027863 A1* | 1/2020 | Kleijnen | H01L 25/13 |
| 2021/0188155 A1* | 6/2021 | Massa | F21S 41/192 |
| 2023/0036850 A1 | 2/2023 | Olsen et al. | |

FOREIGN PATENT DOCUMENTS

| | | |
|---|---|---|
| DE | 19819088 A1 | 11/1999 |
| EM | 004039451-0001 | 8/2017 |
| EM | 006964193-0001 | 10/2019 |
| EM | 008005813-0001 | 7/2020 |
| FR | 2917812 A1 | 12/2008 |
| JP | 2005142060 A | 6/2005 |
| KR | 20110004594 U | 5/2011 |
| WO | 2011006209 A1 | 1/2011 |
| WO | 2021142350 A1 | 7/2021 |

OTHER PUBLICATIONS

Code 3, CD3794AW_Spec https:www.vehiclesafetysupply.com/images/files/CD3794AW_Spec.pdf Feb. 4, 2021.
Defvnsy—Pack of 4—Ultra Slim Amber 6-LED Strobe Light, retrieve online at https://www.amazon.co/uk/JAVR-Universal-Emergency-Warning-DC 12V-24V/dp/B07S614Y976, dated as first available: May 23, 2019.
Ditrio, "Universal Underglow LED Strip Light Kit M12r or Motorcycles," https://www.ditrio.com/product/underglow-led-strip-kit-m12r/, accessed Dec. 2, 2019, 7 pages.
Dow, "Dow Corning, MS-1002 Moldable Silicone", Produce Information Lighting, Feb. 6, 2017, 3 pages.
75 Chrome Shop, Dual-Color Ambert White Flexible LED Light 75 Chrome Shop https://www.75chromeshop.com/all-products/dual-color-amber-white-flexible-red-light/ Aug. 2022.
Khatod, "Khatod Introduces Nactus Optical System Optics for Lighting," https://www.ledsmagazine.com/company-newsfeed/article/16679588/khatod-introduces-nactus-optical-system-opitcs-for-led-lighting, Mar. 12, 2013, 8 pages.
Mpower, "Fascia Installation Espanol", video, retrieved at www.youtube.com/watch?v=P_IWGUb0z28&t=13s, dated Sep. 27, 2016.
Mpower, SoundOff Signal, mpower HD Light and Universal Rock Bracket, "Introducing the Four Inch HD Light . . . Use it Alone or with Our New Universal Rock Bracket", Mar. 1, 2018, 1 page.
The Dow Chemical Company ("Dow"), "Enabling Advanced Automotive Lighting Applications with Moldable Optical Silicones," Steinbrecher, et al., Presented May 31, 2019, 25 pages.
The Dow Chemical Company, Case Study: Soundoff Signal, Emergency vehicle LED lighting gets more visible—and more rugged—with co-molded silicones from Dow, Oct. 25, 2016, 2 pages.
Seisso, 4-Pack 6 LED Amber Strobe Lights Vehicles Trucks Emergency Strobe Lights Kit, retrieved online at https://www.amazon.co.uk/Vehicles-Emergency-Warning-Surface-Waterproof/dp/B0817T6C6H?th=1, dated as first available: Nov. 8, 2019.
Design U.S. Appl. No. 29/720,127, filed Jan. 9, 2020, 9 pages.
Whistler, 2017 Domestic Product Catalog, accessed Dec. 2, 2019, 28 pages.

\* cited by examiner

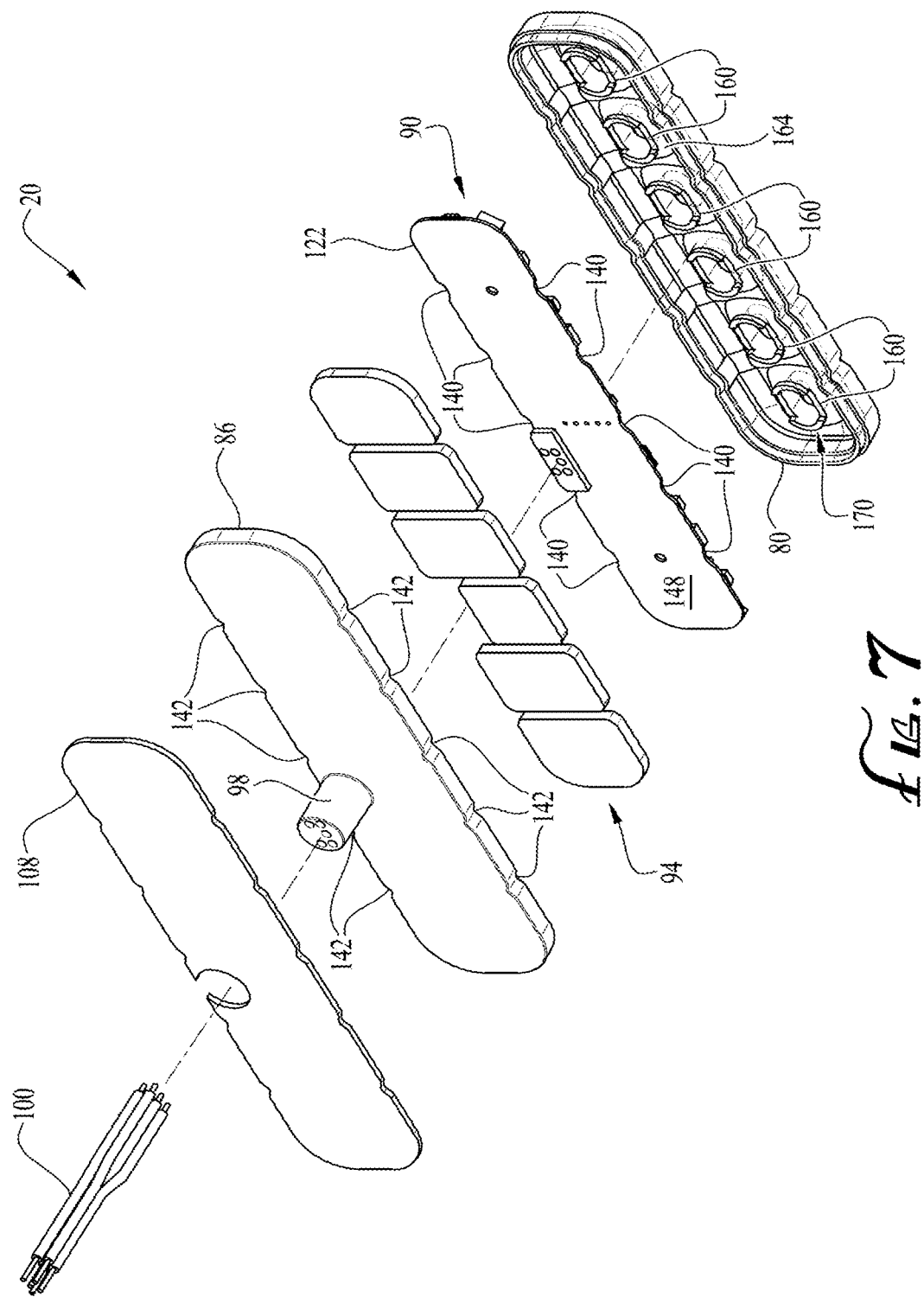

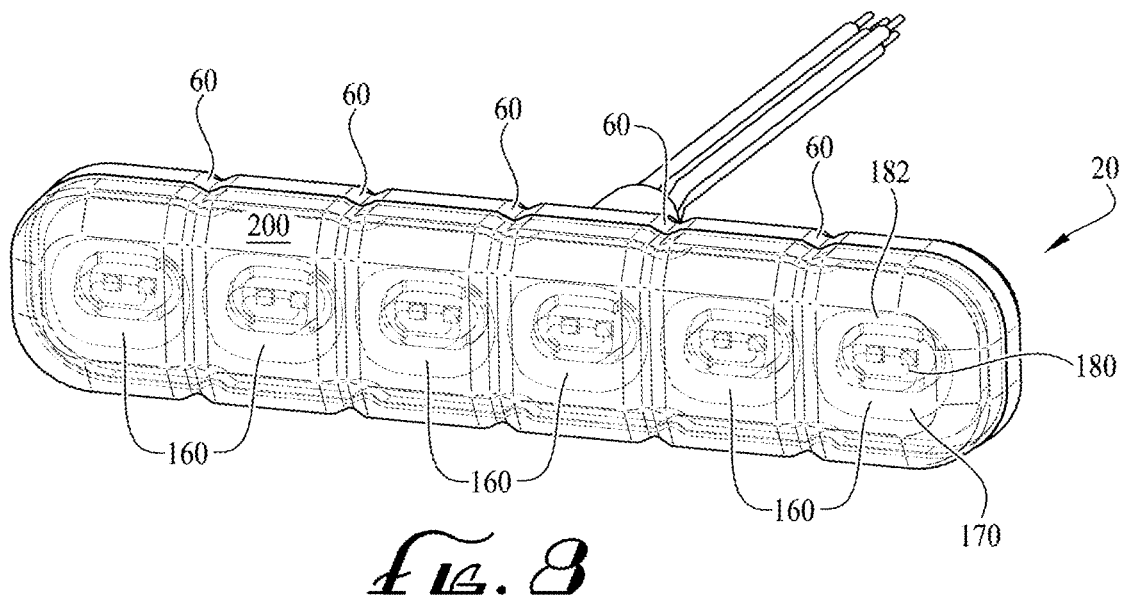

fig. 8

| FEATURE / PART # | DESCRIPTION / COMMENTS |
|---|---|
| Voltage | 10-30 VDC |
| Types | Dual color version with 1616 LED |
| Programming | Refer to the following Pattern Table |
| LED Colors | Dual color warning: AW/AB/RA/RB/RW/BW |
| Flash Patterns / Software | Flash patterns (Dual color pattern list) Refer to the following Pattern Table |
| Model Type | Series (Dual Color) |
| Mouting | Standard : 3M adhesive    Surface : Bezel |
| Bezels | Black standard with light.  Chrome as an option. | fig. 9

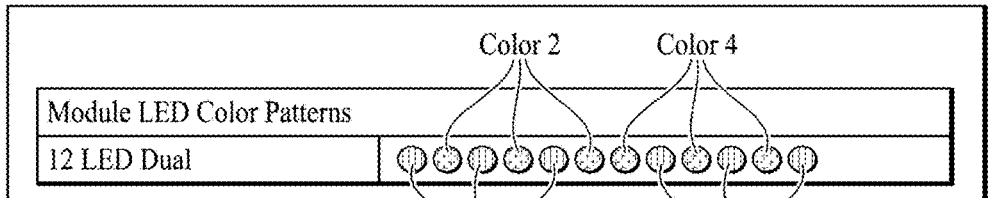

Fig. 10

| Feature / Part # | DESCRIPTION / COMMENTS |
|---|---|
| Cabling | 5 wires. One for ground (Black), one for warning (Red), one for warning (White), one for pattern change (Blue), one for sync (Yellow), Blue wire to positive be for dimming.<br>Wire Function:<br><table><tr><th>COLOR</th><th>FUNCTION</th></tr><tr><td>RED</td><td>Dual Positive, Colors 1 & 3</td></tr><tr><td>WHITE</td><td>Dual Positive, Colors 2 & 4</td></tr><tr><td>BLACK</td><td>Negative</td></tr><tr><td>BLUE</td><td>Pattern Select to Negative / Dimming</td></tr><tr><td>YELLOW</td><td>Synchronized Function</td></tr></table><br>Apply Blue to touch Black Wire:<br><table><tr><th>PUSH</th><th>FUNCTION</th></tr><tr><td>0 ~ 1 sec.</td><td>next pattern</td></tr><tr><td>1 ~ 3 sec.</td><td>previous pattern</td></tr><tr><td>3 ~ 5 sec.</td><td>factory default pattern</td></tr><tr><td>5 ~ sec.</td><td>last pattern</td></tr></table> |

Fig. 11

| FLASH PATTERN SUMMARY |||
|---|---|---|
| FLASH PATTERN # | DESCRIPTION | FLASHES PER MINUTE |
| 1 | SINGLE 75 | 75 |
| 2 | SINGLE 375 | 375 |
| 3 | DOUBLE 75 | 75 |
| 4 | DOUBLE 120 | 120 |
| 5 | TRIPLE 75 | 75 |
| 6 | QUAD 75 | 75 |
| 7 | QUAD 120 | 120 |
| 8 | STEADY BURN | N/A |

FIG. 12

FLEXIBLE DIRECTIONAL VEHICLE WARNING LIGHT

RELATED APPLICATION

This application is a continuation of U.S. patent application Ser. No. 17/758,537, filed Jul. 8, 2022, which is a National Stage of International Application No. PCT/US2021/012815, filed Jan. 8, 2021, which claims priority benefit of U.S. Provisional Patent Application No. 62/959,149, filed Jan. 9, 2020, which are hereby incorporated by reference in their entireties.

TECHNICAL FIELD

This disclosure generally relates to light heads (also called light modules or light engines) such as a Society of Automotive Engineers (SAE) J595 and J845 Class 1 type of directional flashing optical warning device for authorized emergency, maintenance, and service vehicles. In particular, this disclosure relates to light heads including flexible materials.

BACKGROUND INFORMATION

Rigid directional warning lights employ adapters and bulky bezels or brackets to conform to curved vehicle surfaces. Some other lighting devices include flexible materials. Such products, however, typically provide non-flashing (i.e., steady or so-called steady burn) illumination modes. These modes can be achieved using electronics having a relatively small footprint that need not hinder bendability of the lighting device.

In contrast, electronics for controlling a flashing warning signal have a relatively large footprint that introduces rigidity hindering bendability. Vehicle warning lights also produce a relatively high amount of heat.

SUMMARY OF THE DISCLOSURE

Disclosed is a flexible directional warning light. In some embodiments, the warning light is designed so that each end is bendable along its longitudinal axis up to 30° from the axis to conform to curved vehicle surfaces. Flexible components of the disclosed embodiments facilitate bending and include a bendable optic, bendable backing, bendable circuitry, and a segmented heatsink. Accordingly, the disclosed device is mountable onto a curved vehicle surface without cumbersome mechanical adapters. This allows the end user to use a single type of device for mounting on both flat and curved services of a vehicle in locations that previously would have necessitated specialized bezels or a combination of different light module shapes.

Additional aspects and advantages will be apparent from the following detailed description of embodiments, which proceeds with reference to the accompanying drawings.

BRIEF DESCRIPTION OF THE DRAWINGS

FIGS. 6 and 7 are exploded isometric views showing, respectively, front and rear views of the light module shown in FIG. 3.

FIG. 8 is a pictorial view of the light module shown in FIG. 3 showing an oval optical element in each of six segments of a flexible optic of the light module.

FIG. 9 is a table describing various features of the light module.

FIG. 10 is a table showing options for six dual-color LEDs included in the light module.

FIG. 11 is a table describing electrical and control functions of each wire of the light module.

FIG. 12 is a table describing flash patterns.

DETAILED DESCRIPTION OF EMBODIMENTS

Figure 1:
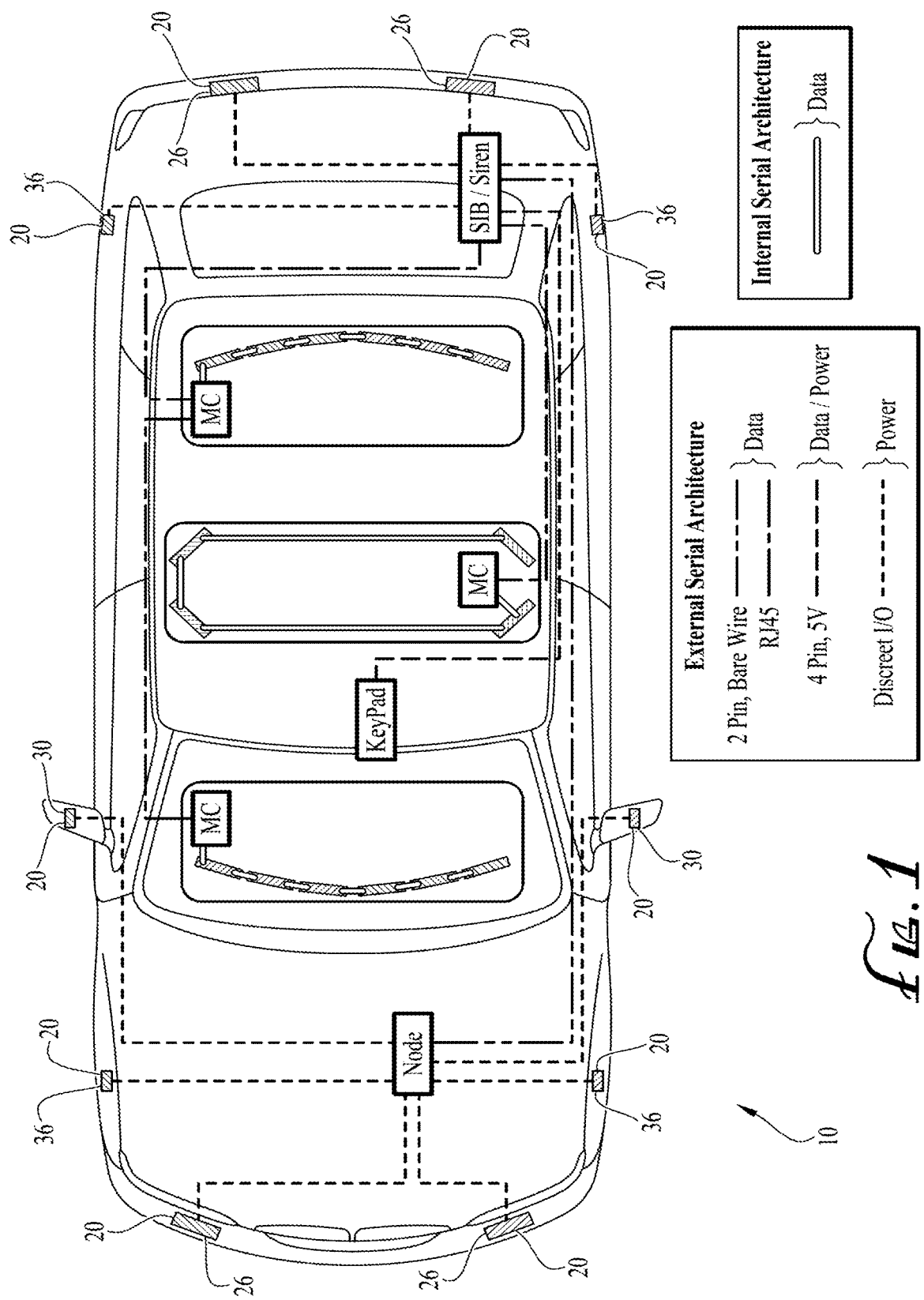
FIG. 1 is a top plan view of an emergency vehicle including light bars and directional lighting on its periphery.

FIG. 1 shows an overhead view of an outline of an emergency vehicle 10. Vehicle 10 is equipped with lightbars and data and power wiring that are the subject of U.S. Pat. No. 10,773,634 by Code 3, Inc. of St. Louis, Missouri, which is an affiliate company of Electronic Controls Company (ECCO) of Boise, Idaho, the assignee of this patent application. In particular, FIG. 1 shows how light modules 20 are mounted about the periphery of vehicle 10. The present inventors have recognized that, for some applications, it would be advantageous to employ a unitary type of light module that is mountable atop flat or curved surfaces of vehicle 10 without specialized curved bezels. For instance, FIG. 1 shows how light module 20 may be deployed as bumper light modules 26 mounted atop flat surfaces, mirror light modules 30 conforming to curved mirror-housing surfaces, and fender light modules 36 conforming to exterior surfaces of fender flares.

Figure 2:
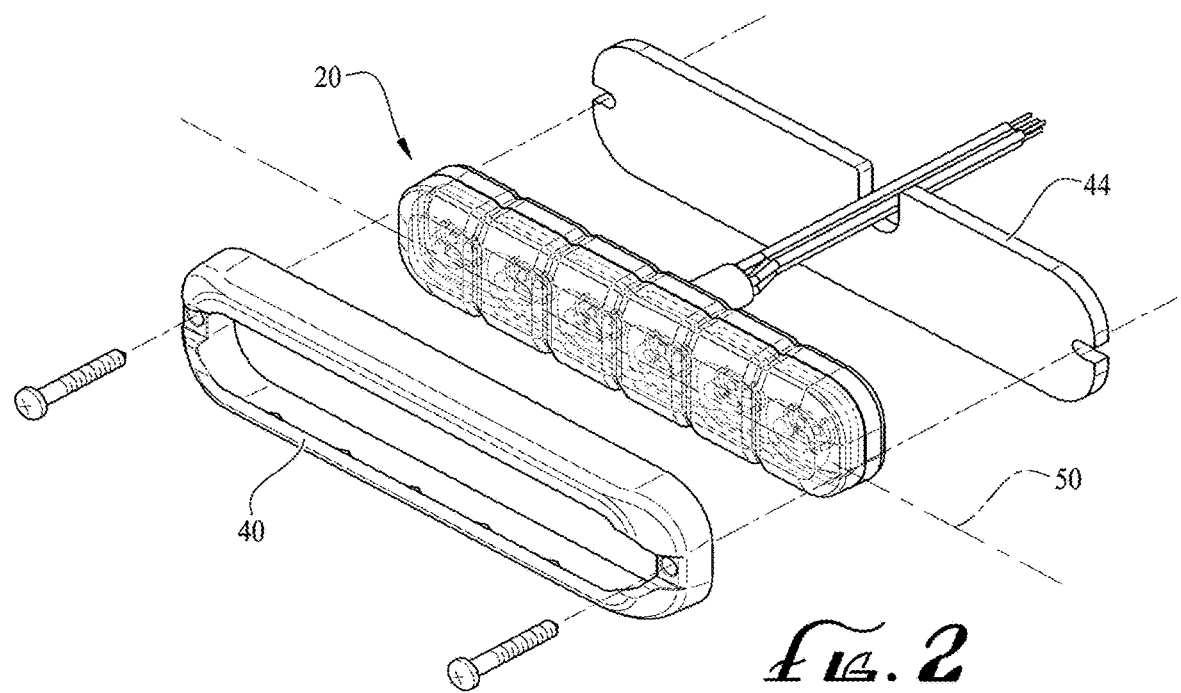
FIG. 2 is partly exploded isometric view of a light module shown in FIG. 1 that includes an optional low-profile bezel and foam pad for accommodating flat-surface mounting locations.
Figure 3:
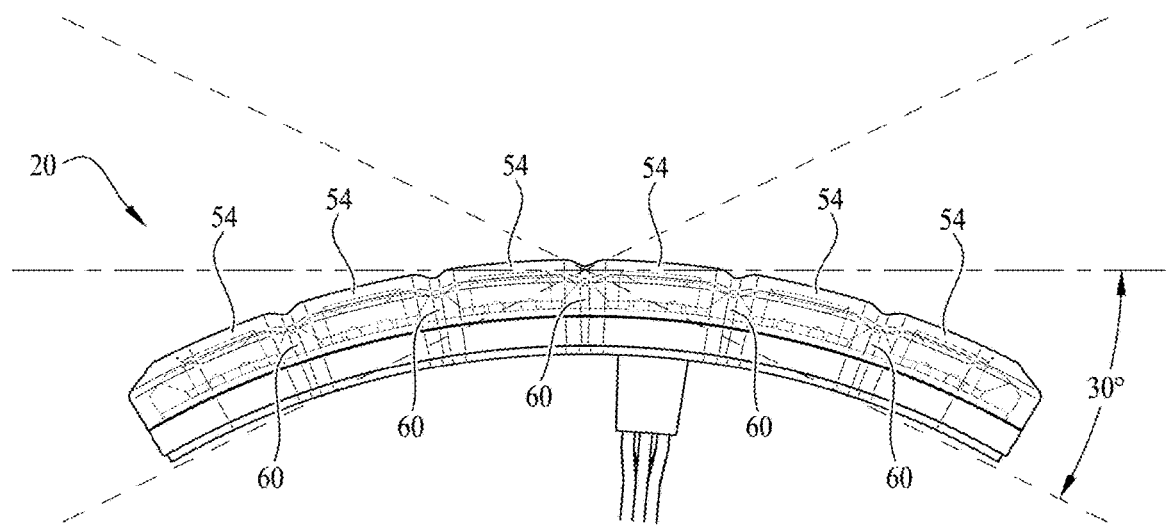
FIG. 3 is side elevation view of the light module of FIG. 2 without the optional bezel and foam pad and shown bent along its longitudinal axis for accommodating curved-surface mounting locations.

FIGS. 2 and 3 show flexible light module 20, respectively, with and without a removable flat-surface mounting bezel 40 and foam backing pad 44 for accommodating flat-surface mounting locations. Such optional components may be removed for mounting on curved surface, as shown in FIG. 5.

Figure 4:
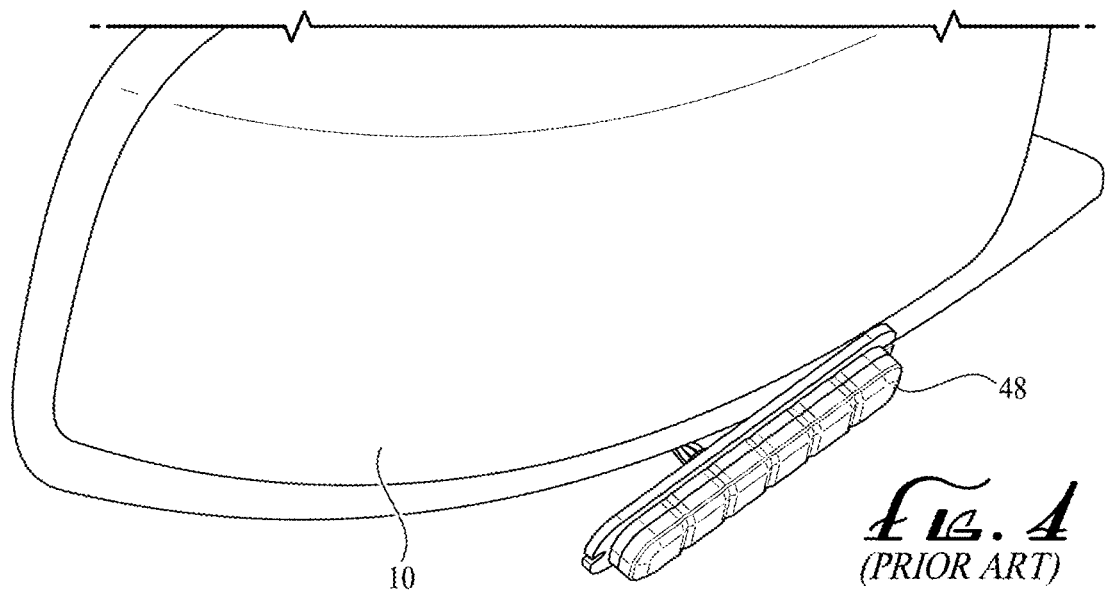
FIG. 4 is a pictorial view of a typical rigid light module that cannot be deployed on a curved exterior surface of a mirror housing without an additional bezel or bracket.
Figure 5:
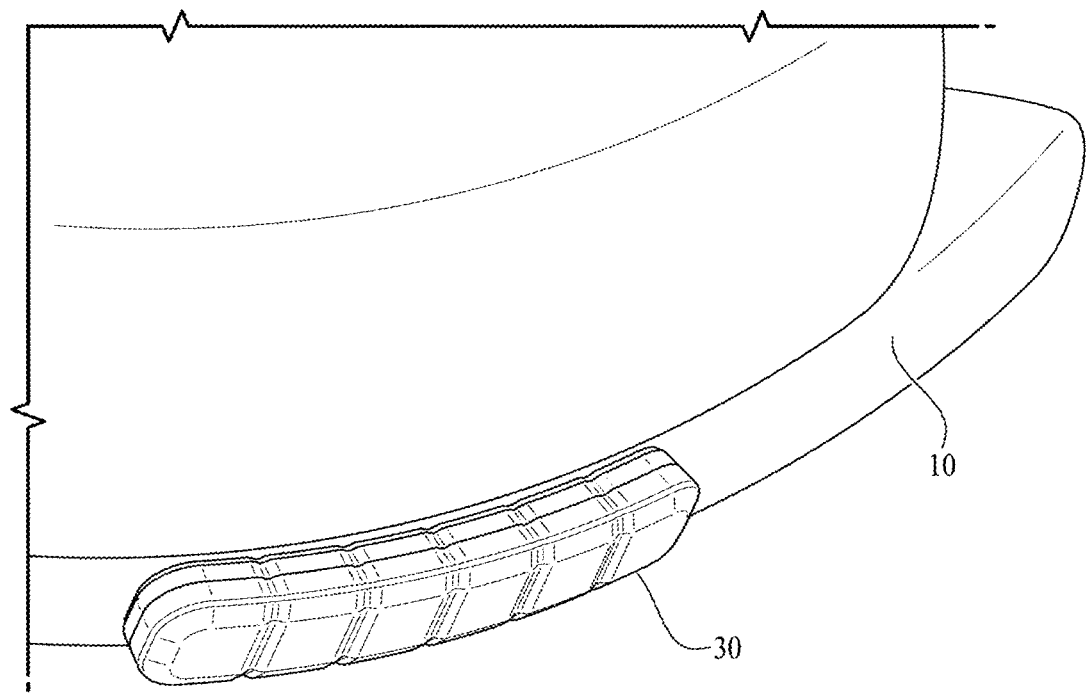
FIG. 5 is a pictorial view of the light module of FIG. 3 shown conforming to a curved exterior surface of a mirror housing.

FIGS. 4 and 5 provide a comparison in which a prior art light module 48 (FIG. 4) cannot be installed on a mirror housing without an additional bezel or bracket. In contrast, FIG. 5 shows light module 20 is bendable along its longitudinal axis 50 (FIG. 2). Bending is facilitated by flexible components (described later with reference to FIGS. 6 and 7) and multiple light segments 54 (e.g., six) defining five flex joints 60 therebetween. Flex joints 60 are oriented such that they are transverse to longitudinal axis 50 to facilitate 30° of bending per side (60° total) from axis 50. Skilled persons will now appreciate, however, that some flex joints orientations and segment locations may be varied to establish different bend radiuses across different axes.

Figure 6:
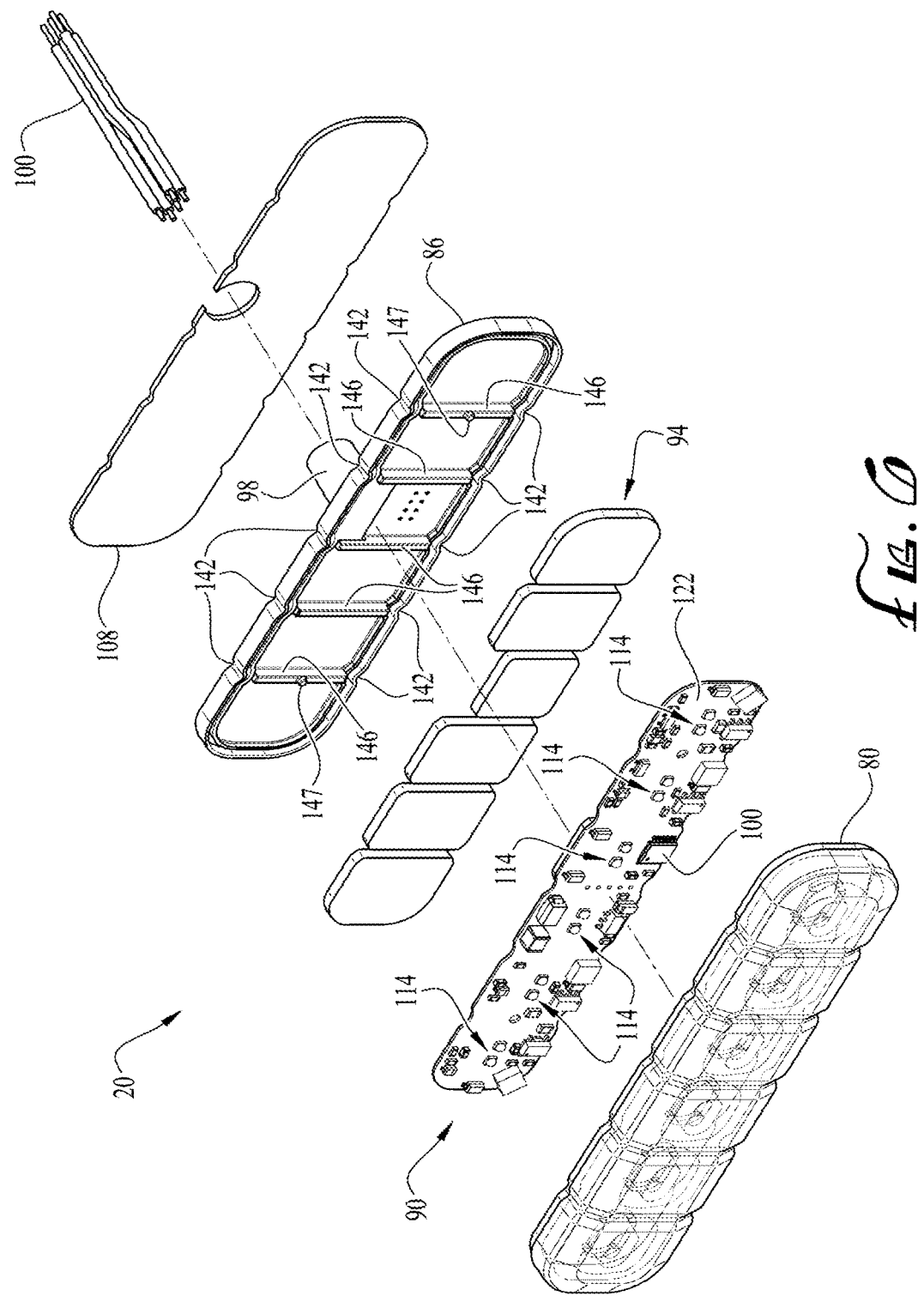

FIGS. 6 and 7 show in detail components of light module 20. Specifically, modules 20 include a flexible optic 80. In some embodiments, optic 80 is a clear and flexible rubber, such as silicone, polyurethane, or other types of flexible material. A flexible backing 86 is matable with optic 80 to encase electrical components 90 and metal (e.g., aluminum) heatsink segments 94 (also referred to collectively as heatsink 94). Heatsink segments 94 are discrete components, but in other embodiments they are formed a single segmented component (e.g., kerf bendable metal). A wiring harness 98 is also molded onto a rear side of backing 86 for receiving wires 100. An optional double-sided adhesive panel 108 is also shown.

Electrical components 90 include circuitry for controlling LEDs. Specifically, a microcontroller 110 (FIG. 6) and associated circuitry control optical emission from six pairs of color LEDs 114. Such circuitry is mounted atop a flexible electrical substrate, i.e., circuit board 122. In some embodiments, flexible circuit board 122 is an aluminum-backed and copper clad printed circuit board (PCB) including pairs of opposing peripheral relief notches 140 (FIG. 7) to facilitate flexing along flex joints. Similarly, backing 86 includes corresponding external notches 142 (FIG. 6) and internal ribs 146 (FIG. 6) that facilitate bending and segmentation of components of heatsink 94. Alignment protrusions 147 on ribs 146 fit in corresponding apertures to aid in alignment of and heat dissipation from board 122.

In another embodiment (not shown), each segment of light module 20 includes a discrete PCB, and the discrete PCBs are electrically coupled via wires or flexible flat cables (FFCs). In other embodiments, one or more flexible printed circuits (FPC) are employed in lieu of or in addition to FFCs and PCBs. Skilled persons will appreciate that the choice of flexible circuit materials will depend on the size of the light module, the amount of desired bend and bend radius, the heat dissipation properties, and other design parameters.

During assembly, an adhesive, ultrasonic weld, or other technique is used to bond each metal segment of heatsink 94 to its corresponding confronting portion of electrical components 90. Electrical components 90 and heatsink 94 are assembled into backing 86, then optic 80 is bonded to backing 86 with adhesive to form a weather resistant flexible housing. In the present example, heat is conducted from the LEDs and electronics through PCB surface 148 (FIG. 7), through aluminum heatsink 94, and to backing 86. A thermally conductive grease or adhesive is applied between heatsink 90 and backing 86 to further facilitate heat dissipation.

Optical elements acts upon the light passing through the clear (or colored) flexible optic 80, and may comprise such as a lens, prism, or mirror. In some embodiments, an optical element provides for total internal reflection (TIR) maximizing light emission from LEDs. In the present example, FIGS. 7 and 8 show in greater detail features of optical elements 160 that direct light from LEDs 114. Each pair of LEDs 114 is centrally located in an aperture of a corresponding elliptic cylinder 170 defining an inner surface of an optical element. An outer wall 164 (shown in FIGS. 7 and 13) defining is generally frustoconical or otherwise tapered toward the LED-receiving aperture to define elliptic cylinder 170. Such taper also facilitates bending by providing spatial displacement between optical elements 160 as they are bent inwards towards each other. Additional details of optic 80 are shown and described later with reference to FIG. 13

FIG. 8 also shows how each elliptic cylinder 170 is capped by a silicone membrane 180 extending between internal silicon sidewalls 182. Flex joints 60 are formed by depressions in an exterior surface 200 of optic 80 between optical elements 160. Accordingly, each segment 54 (FIG. 3) includes a separate optic, pair of LEDs and associated circuitry, heatsink segment, and at least one flex joint.

FIG. 9 provides an overview of various features available in light module 20. For instance, it is compatible with 12- and 24-volt (V) systems, supports various color options described in connection with FIG. 10, and includes flash patterns that are configurable based on signals applied to wires in accordance with FIGS. 11 and 12.

Several color options are shown at the top of FIG. 10, although skilled persons will now appreciate that many other options and combinations may be selected. For instance, at the bottom of FIG. 10 an example red and amber embodiment is shown. In this example, red and amber LEDs on a left-hand side are called, respectively, Color 1 and Color 2. Similarly, red and amber LEDs on a right-hand side are called, respectively, Color 3 and Color 4. These "Color" terms appear in connection with configuring flash pattern options described in connection with the "Function" shown in FIG. 11.

FIG. 11 is a table describing wiring and electrical control functions for light module 20, according to one embodiment. With reference to FIG. 11, dual positive means positive can be applied to red alone, white alone, or both red and white. The sync function uses a signal from the microprocessor so if two lights are connected the timing of the flashes is synchronized. This allows multiple lights on the vehicle to either flash at exactly the same time or exactly opposite from each other if they are set to different phases. Finally, the term negative is DC ground.

FIG. 12 shows examples of various standard flash patterns available for light module 20. The patterns are established by applying a voltage to one or both "Red" and "White" wires, and by sequentially grounding the "Blue" wire until the desired pattern is set. The patterns include options for different flash rates measured in flashes per minute (FPM), different synchronous color combinations (not shown), and different alternately flashing color combinations (not shown). Steady burn (i.e., no appearance of flash) options are also supported.

Figure 13:
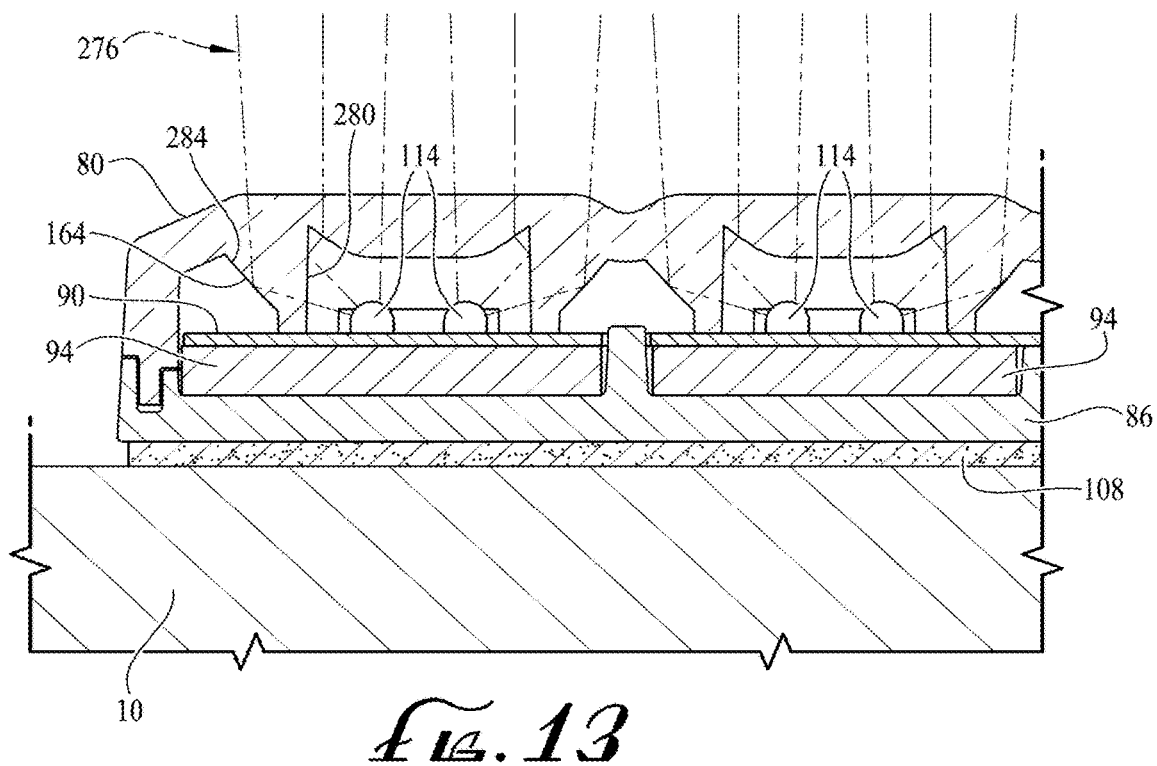
FIG. 13 is a fragmentary, cross-sectional side elevation view of the light module showing how its optic directs light output from LEDs.

FIG. 13 shows the directional light output 276 generated by optic 80. A peripheral portion of light emitted from LEDs 114 passes through a solid inner wall 280 and reflects from an inside surface 284 of outer wall 164 and outward through optic 80. Other light from LEDs 114 passes through the center of optic 80.

Figure 14:
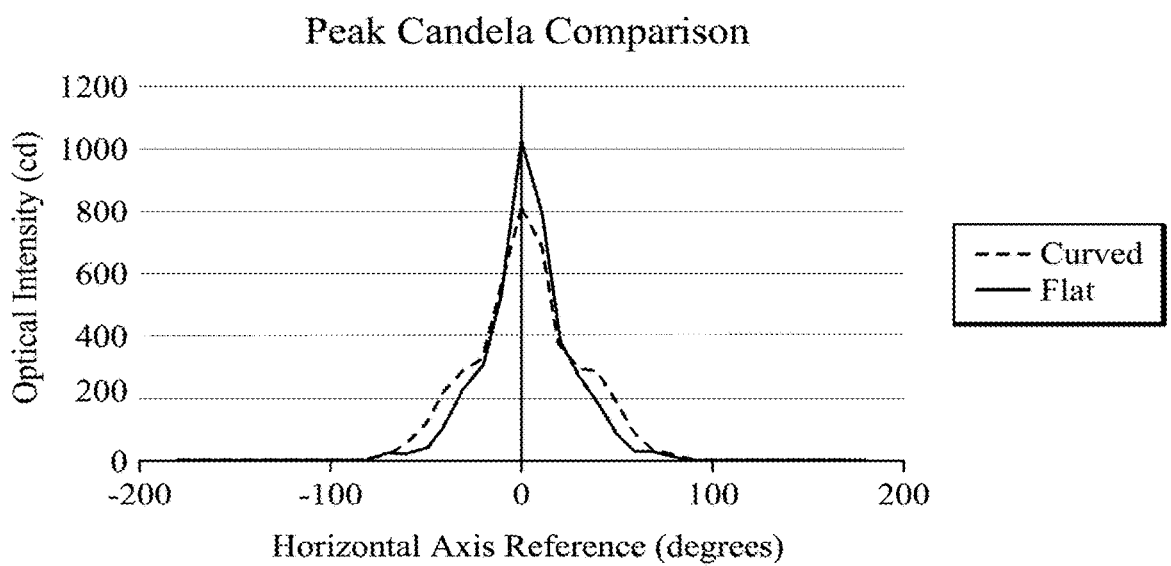
FIG. 14 is a graph showing directional light output from the light module in flexed an unflexed positions.

FIG. 14 shows light module 20 emits SAE J845 Class 1 light output across a 60-degree spread when it is mounted flat. At its maximum curvature, light module 20 provides 80° of SAE J845 Class 1 light output. There is some reduction of light output at the center of light module 20 when it is mounted on a curved surface.

Skilled persons considering this disclosure will appreciate that many changes may be made to the details of the above-described embodiments without departing from the underlying principles of the invention. The scope of the present invention should, therefore, be determined only by the following claims and equivalents.

The invention claimed is:

1. A flexible optic for a directional vehicle warning light, comprising:
   a unitary, bendable body formed from a transparent or translucent flexible material, the body defining a longitudinal axis;
   a plurality of optical elements distributed along the longitudinal axis, each optical element configured to direct light emitted from a corresponding light-emitting diode (LED) along an optical axis of the element, such that combined emissions from the optical elements produce directional illumination; and relief sections transverse to the longitudinal axis that are located between the plurality of optical elements in the unitary, bendable body, and in which the optical elements include tapered portions configured to provide total internal reflection (TIR) for facilitating the directional illumination.

2. The flexible optic of claim 1, in which the flexible material comprises silicone.

3. The flexible optic of claim 1, in which the optic is configured to bend up to 30 degrees per side relative to the longitudinal axis.

4. The flexible optic of claim 1, in which the relief sections include flex joints, the flex joints facilitating bending of the flexible optic along the longitudinal axis.

5. The flexible optic of claim 1, in which each optical element comprises an inner reflective surface configured to direct light through an outer surface of the optic along the optical axis of the element.

6. The flexible optic of claim 1, in which the directional illumination maintains a minimum optical intensity of 800 candela at its midpoint when the optic is in its curved state.

7. The flexible optic of claim 1, in which the optic satisfies SAE J845 Class 1 light intensity requirements when curved or flat.

8. The flexible optic of claim 1, in which the optic is configured to sealably mate with a backing to inhibit ingress of dust and water.

9. The flexible optic of claim 1, in which the optic maintains the directional illumination with a reduction in optical intensity at the midpoint of no more than about 20% when transitioning from a flat to a curved state.

10. The flexible optic of claim 1, in which the optic includes alignment features to ensure precise positioning of the optical elements over corresponding light-emitting diodes.

11. The flexible optic of claim 1, in which the optical elements are elongated along the longitudinal axis and shorter in a transverse direction.

12. The flexible optic of claim 1, in which the optic includes external indentations along its outer surface to facilitate bending at predetermined locations.

13. The flexible optic of claim 1, in which the optic is configured for use with light-emitting diodes capable of producing dual-color illumination patterns.

14. The flexible optic of claim 1, in which the optic comprises six optical elements distributed along the longitudinal axis.

15. The flexible optic of claim 14, in which the six optical elements collectively produce a directional light beam that complies with SAE J845 Class 1 light output requirements.

16. The flexible optic of claim 1, in which each optical element is capped by a flexible membrane.

* * * * *